United States Patent Office 3,579,509
Patented May 18, 1971

3,579,509
PROCESS AND 6-β-SUBSTITUTED ETHYL INTERMEDIATES FOR PREPARING 6,6-ETHYLENE-Δ⁴-KETO-Δ⁴ STEROIDS
Kenneth G. Holden, Stratford, N.J., assignor to Smith Kline & French Laboratories, Philadelphia, Pa.
No Drawing. Continuation-in-part of abandoned application Ser. No. 465,788, June 21, 1965. This application Sept. 20, 1965, Ser. No. 488,758
Int. Cl. C07c $173/00$
U.S. Cl. 260—239.57      17 Claims

ABSTRACT OF THE DISCLOSURE 6,6 - ethylene steroids having potent, often enhanced, pharmacodynamic activity compared with their respective parent compounds are prepared by condensing a 3-lower alkoxy-3,5-diene steroid with β-acyloxyethylmercuric acylate, hydrolyzing the resulting 6-β-acyloxyethyl-3-lower alkoxy-3,5-diene steroid to give a 6-β-hydroxyethyl-3-lower alkoxy-3,5-diene steroid or a 6-β-hydroxyethyl-3-keto-Δ⁴ steroid, esterifying same and cyclizing said ester.

---

This application is a continuation-in-part of copending Ser. No. 465,788, filed June 21, 1965 now abandoned.

This invention relates to new processes for preparing biologically active steroids containing the 3-keto-Δ⁴-6,6-ethylene system. This invention also relates to new and useful intermediates prepared in the course of practicing these new processes.

The 6,6-ethylene or spirocyclopropyl steroid compounds produced by these processes have potent, often enhanced, pharmacodynamic activity compared with their respective parent compounds. For example the 6,6-ethylene testosterones have potent anabolic-androgenic activity, the 6,6-ethylenepregnenes, i.e. 6,6-ethyleneprogesterone, have progestational activity and the 6,6-ethylenecorticoids, i.e. 6,6-ethylenehydrocortisone or cortisone, have anti-inflammatory activity.

The reactions of this invention are applicable to any steroid possessing the necessary 3-lower alkoxy-3,5-diene structure (I below) but having no chemically interfering groups. Exceptions will be apparent to those skilled in the art, for example, yields are quite low in the 19-nor series because of the competing aromatization reaction. If there are such groups they should be protected as known to those skilled in the art such as converting hydroxy groups to their ester or ether derivatives. The reactions claimed are most advantageously run under very mild conditions however and their applicability is very wide.

Certain intermediates particularly those having the structures III→VI are an important aspect of this invention. Each of these intermediates possesses the 6-β-substituted ethyl group which is essential for the cyclization reaction which produces the desired 3-keto-Δ⁴-6,6-ethylene end product.

The overall process of this invention is illustrated by the following:

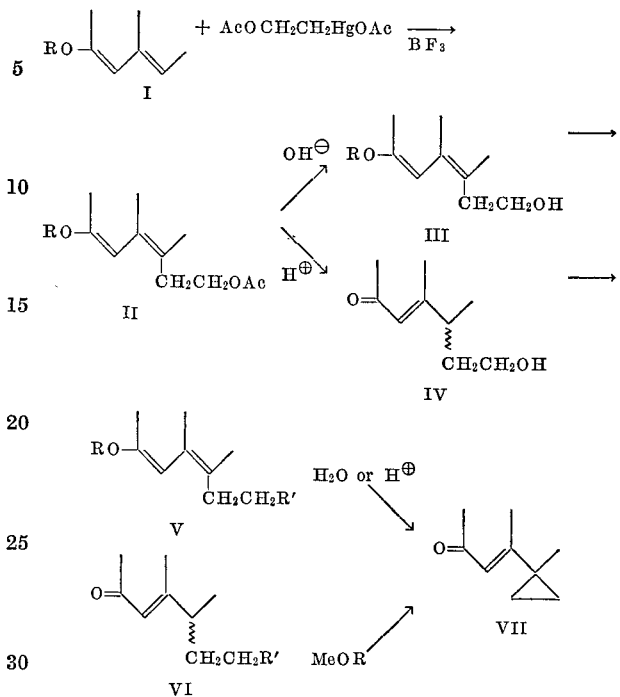

The process uses as a starting material a 3-lower alkoxy-3,5-diene of Formula I in which R is a lower alkyl of a maximum of 6 carbons preferably methyl or ethyl. These compounds are either known to the art or are prepared by standard reactions.

The diene (I) is condensed with a β-acyloxyethylmercuric acylate [see K. Ichikawa et al., J. Am. Chem. Soc., 81:5316 (1959)]. The acyl groups of the mercury reagent may be derived from any lower carboxylic acid of a maximum of 10 carbon atoms but the most convenient group to use is acetyl ($CH_3CO-$). Lower alkyl groups such as methyl may optionally be present on the ethyl portion of this reagent. The unsubstituted ethyl reagent cyclizes most smoothly and is preferred.

The reaction is carried out most conveniently in a non-protonic organic solvent in which the reactants are soluble and which is inert under the reaction conditions such as a lower ether or preferably a halogenated lower alkane solvent such as methylene chloride, chloroform, ethylene chloride, etc. A catalyst for the reaction is present in the presence of a Lewis acid for example aluminum chloride, ferric chloride, zinc chloride, stannic chloride, or preferably boron trifluoride most conveniently as its etherate. Protonic acids such as perchloric or p-toluenesulfonic acid have proved ineffective as catalysts. The only reaction observed with such acids is conversion of the methoxydiene back to the 3-keto-Δ⁴-structure. The reaction may be carried out over a range of temperatures and duration of reaction but most conveniently from about 0° C. to about room temperature, preferably 0–5° C., for up to about 5–7 days to give the desired 6-β-acyloxyethyl-3- alkoxy-3,5-diene (II). In the 19-nor series this reaction is most convenientlyt carried out at 0° C. for from about 2–3 hours or at room temperature for up to 4–5 minutes to minimize the competing aromatization reaction.

This compound is then converted to the alcohol form (III) by mild alkaline hydrolysis conditions such as treatment with alcoholic sodium or potassium hydroxide or to the 3-keto-Δ⁴-6-β-hydroxyethyl (IV) form by mild acid treatment such as dilute hydrochloric acid. This reaction often also hydrolyzes the hydroxyl protecting groups where present. If alkali sensitive centers are present such as a 17-spirolactone group the reaction may be carried out using a sodium carbonate solution.

The 6-β-hydroxyethyl intermediates (III or IV) are then converted into their reactive ester derivatives such as the reactive halide, i.e. chloride, bromide or iodide or a reactive lower alkyl or arylsulfonate, i.e. methylsulfonate, phenylsulfonate or preferably p-toluenesulfonate (tosyloxy) by standard reactions. For example the usually used tosyl ester intermediate is prepared by reacting the hydroxyethyl intermediate with p-toluenesulfonyl chloride in an excess of pyridine at room temperature for several hours. Quenching in water and extraction gives the desired ester. If the same reaction is continued overnight a large proportion of the reactive β-chloroethyl intermediate is recovered. Other conventional esterification reactions known to the art can be used alternatively.

The reactive esters in the 3-alkoxy-3,5-diene series (V) have unexpectedly been found to cyclize to the desired 6,6-ethylene-3-keto-Δ⁴ end product (VII) under very mild conditions such as in the presence of water on an alumina column or preferably simply by the addition of water to the tosylation reaction after formation of the tosylate. In fact the ease of cyclization often makes isolation of these intermediates difficult. The esters in the 3-keto-Δ⁴ series (VI) on the other hand cyclize readily in the presence of an alkali metal lower alkoxide such as sodium or potassium tert.-butoxide, methoxide or ethoxide. The reaction conditions of the cyclization step in the overall process are very mild such as at about room temperature in a standard alcoholic solvent.

The most critical steps of this overall process are the insertion of the acyloxyethyl group at position 6 and the final cyclization reaction. The other steps can be carried out under a wide range of standard reaction conditions. The reaction conditions of the two critical steps can also vary widely since the reactions proceed under very mild conditions.

Examples of the novel intermediates which are a vital part of this invention are the following:

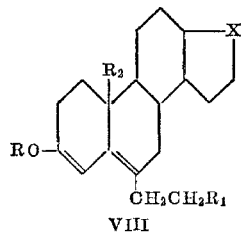

VIII in which:

R is lower alkyl such as methyl or ethyl;
R₁ is hydroxy, acyloxy, halo such as chloro or alkyl or aryl sulfonyloxy such as tosyloxy; and
R₂ is methyl or hydrogen or substituted methyl;

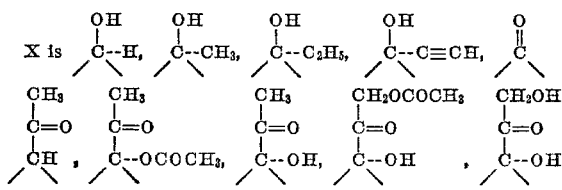

or

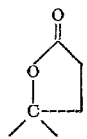

with optional oxo or hydroxymethylene ring members at position 11 as well as conventional substituents at positions 9 and 16 such as an 9α-fluoro or a 16-methyl or hydroxyl.

The corresponding intermediates in the 3-keto-Δ⁴-series are also another part of this invention as represented by partial structures IV and VI.

Where the terms acyl, lower alkyl or lower alkoxides are used herein for practical usage a maximum carbon content of 10 is indicated but the groups such as acetyl, methyl, ethyl, methoxy, ethoxy or tert.-butoxy are preferably and most conveniently used. Other variations of this invention will be apparent to those skilled in the art. The examples presented hereafter are to illustrate the practice of this invention to those skilled in the art but are not intended to limit the scope of this invention.

EXAMPLE 1

To a stirred solution of 5.0 g., of 3-methoxyandrosta-3,5-dien-17-one [A. L. Nassbaum et al., J. Org. Chem., 26 3425 (1961)] and 6.3 g. of β-acetoxyethylmercuric acetate (K. Ichikawa, et al., J. Am. Chem. Soc., 81 5316 (1959)] in 25 ml. of methylene chloride is added 1 ml. of boron trifluoride etherate. After one hour at room temperature the reaction is quenched by the addition of 4 ml. of pyridine, decanted from precipitated metallic mercury, and washed with dilute sodium carbonate solution. Evaporation of the dried methylene chloride phase gives a residue of crude 3-methoxy-6-(β-acetoxy)ethylandrosta-3,5-dien-17-one which is partially purified by filtering a solution of the residue in benzene-petroleum ether (1:2) through a column of 125 g. of activity III alumina and evaporating the filtrate to a residue.

The residue is then dissolved in 75 ml. of ethanol and refluxed with 25 ml. of 10% aqueous sodium hydroxide for one hour. The cooled reaction mixture is poured into water and extracted with methylene chloride. Evaporation of the combined and dried methylene chloride extracts gives crude 3 - methoxy - 6-(β-hydroxy)ethylandrosta-3,5-dien-17-one.

The crude product is dissolved in 20 ml. of 80% aqueous acetic acid and heated at 100° C. for 30 minutes. Most of the solvent is removed under reduced pressure and the residue is distributed between methylene chloride and dilute aqueous sodium carbonate solution. The methylene chloride phase is dried over anhydrous magnesium sulfate, filtered and evaporated to give a residue of crude 6α-(β-hydroxy)ethylandrost - 4 - ene - 3,17-dione. Purification is effected by chromatography on activity III alumina. The product is eluted with methylene chloride and recrystallized from ether-acetone and then from benzene to give the pure product, M.P. 188–192° C.

A solution of 1.5 g. of 6α-(β-hydroxy)ethylandrost-4-ene-3,17-dione in 10 ml. of pyridine is reacted with 1.0 g. of p-toluenesulfonyl chloride for three hours at room temperature. The reaction mixture is poured into water and extracted with methylene chloride. The methylene chloride extracts are washed with dilute, aqueous phosphoric acid, dried and evaporated to a residue of 6α-(β-tosyloxy)ethylandrost-4-ene-3,17-dione.

The crude tosylate is dissolved in 50 ml. of 5-butanol and treated with 1.0 g. of potassium 5-butoxide under nitrogen with stirring. After 30 minutes the reaction mixture is diluted with water and extracted with ether. The dried ether extract is evaporated, dissolved in benzene and filtered through 30 g. of activity III alumina. Evaporation of the filtrate gives a residue which is crystallized from acetone-hexane to yield 6,6-ethyleneandrost-4-ene-3,17-dione, M.P. 175–178° C.

This important intermediate is converted into the anabolic 6,6-ethylene testosterone by reduction to the 3,17-diol with sodium borohydride in aqueous methanol or lithium aluminum hydride in dioxane than back oxidation at position 3 with dichlorodicyanoquinone in dioxane at room temperature.

EXAMPLE 2

To a stirred solution of 19.5 g. of 17α-acetoxy-3-methoxypregna-3,5-dien-20-one [V. Petrow et al., Tetrahedron, 20:597 (1964)] and 26.6 g. of β-acetoxyethylmercuric acetate in 100 ml. of methylenechloride at 0° C. is added 1.6 ml. of boron trifluoride etherate. After standing for three days at 0° C., the reaction mixture is quenched with 10 ml. of pyridine, decanted from precipitated metallic mercury, washed with aqueous sodium carbonate, dried over anhydrous magnesium sulfate, filtered, and evaporated to a residue. The residue is dissolved in 50 ml. of benzene, diluted with 100 ml. of petroleum ether and decanted from insoluble material onto a column of 250 g. of activity III alumina. Elution with benzene-petroleum ether (1:2), followed by benzene gives 6-(β-acetoxy)ethyl-17α-acetoxy-3-methoxypregna-3,5-dien-20-one which is crystallized from methanol-water to give purified material, M.P. 145–149° C. $[\alpha]_{25}^D$ —152°.

A solution of 12.5 g. of 6-(β-acetoxy)ethyl-17α-acetoxy-3-methoxypregna-3,5-dien-20-one in 150 ml. of methanol containing 15 ml. of 10% aqueous hydrochloric acid is heated at reflux for one hour. Most of the solvent is removed at reduced pressure. The concentrate is poured into water and extracted with methylene chloride. Evaporation of the dried methylene chloride extract gives a residue which is crystallized from acetone-ether to yield 6α-(β - hydroxy)ethyl - 17α - acetoxy - progesterone, M.P. 214–216° C., $[\alpha]_{25}^D$+43°.

A solution of 2.0 g. of 6α-(β-hydroxy)ethyl-17α-acetoxyprogesterone and 1.4 g. of p-toluenesulfonyl chloride in 15 ml. of pyridine is maintained at room temperature for three hours. The reaction mixture is poured into water and extracted with methylene chloride. The methylene chloride extract is washed with dilute phosphoric acid, dried and evaporated to a residue of 6α-(β-tosyloxy)ethyl-17α-acetoxyprogesterone.

The crude tosylate is dissolved in 10 ml. of benzene and 20 ml. of methanol, treated with 0.5 g. of sodium methoxide and stirred under nitrogen for five hours. The reaction mixture is poured into cold, dilute phosphoric acid and extracted with methylene chloride. The methylene chloride extracts are washed with dilute sodium carbonate solution, combined, dried and evaporated to a residue.

The residue is dissolved in 75 ml. of benzene-petroleum ether (1:1) and applied to a column of 60 g. of activity III alumina. The product, 6,6-ethylene-17α-acetoxy-progesterone, is eluted with benzene-petroleum ether (1:1) and benzene and is then crystallized from acetone-hexane, M.P. 213–215° C., $[\alpha]_{25}^D$+172°. This compound is a very potent progestational agent.

EXAMPLE 3

The tosylation reaction is run in the same quantities and manner as described for 6α-(β-tosyloxy)ethyl-17α-acetoxy-progesterone in Example 2 except that the reaction time is increased to 24 hours. After workup the residue is dissolved in benzene and filtered through 30 g. of activity III alumina. The benzene filtrate is evaporated and the residue is crystallized from acetone-hexane to give 6α-(β-chloro)ethyl-17α-acetoxy-progesterone, M.P. 149–152° C.

This material is treated with sodium methoxide in benzene-methanol under the same mild conditions as the tosyloxy derivative in Example 2 to give 6,6-ethylene-17α-acetoxy-progesterone.

EXAMPLE 4

Benzoyl chloride (37 ml.) is slowly added to a stirred solution of 60 g. of testosterone in 180 ml. of pyridine at such a rate that the temperature does not exceed 50° C. After stirring for one hour the reaction mixture is treated with 25 ml. of water. After stirring for an additional 15 minutes an additional 275 ml. of water is added. The reaction mixture is cooled and filtered to give testosterone benzoate which is dried to constant weight, M.P. 180–182° C.

To a stirred suspension of 81.4 g. of testosterone benzoate in 100 ml. of dioxane and 100 ml. of trimethyl orthoformate is added 1.0 g. of p-toluenesulfonic acid. After 1.5 hours the reaction mixture is treated with 10 ml. of pyridine followed by 200 ml. of ice water. The cooled mixture is filtered and the precipitate of 3-methoxy-17β-hydroxyandrosta - 3,5 - diene benzoate is dried, M.P. 183–189° C.

A suspension of 82.7 g. of 3-methoxy-17β-hydroxyandrosta-3,5-diene benzoate in 450 ml. of methylene chloride is stirred at 0° C. under nitrogen and treated with 88.5 of β-acetoxyethylmercuric acetate followed by 6.45 ml. of boron trifluoride etherate. The reaction mixture is stirred for seven hours at 0° C. and is maintained at 0° C. for 19 hours. After stirring for an additional two hours at 0° C. solution is complete. The reaction mixture is maintained at 0° C. for an additional 24 hours, quenched with 30 ml. of pyridine, decanted from precipitated metallic mercury, washed with sodium carbonate solution, dried and evaporated to a residue. The residue is dissolved in 50 ml. of benzene, diluted with 950 ml. of petroleum ether, decanted from insoluble material and evaporated to give crude 6-(β-acetoxy)-ethyl-3-methoxy-17β-hydroxyandosta-3,5-diene benzoate. This can be used directly in the next step or purified by chromatography on activity III alumina followed by crystallization from 95% aqueous ethanol to give a pure sample, M.P. 105–109° C.

A solution of 6.0 g. of crude 6-(β-acetoxy)ethyl-3-methoxy-17β-hydroxyandrosta-3,5-diene benzoate in 75 ml. of t-butanol, 25 ml. of methanol and 10 ml. of 10% aqueous hydrochloric acid is heated at reflux for 1.5 hours. The cooled reaction mixture is concentrated at reduced pressure, poured into water and extracted with methylene chloride. Drying and evaporation of the methylene chloride extracts gives a residue which is dissolved in 75 ml. of benzene and chromatographed on 80 g. of activity III alumina. The product, 6α-(β-hydroxy)-ethyltestosterone benzoate, is eluted with benzene, benzene-methylene chloride (2:1) and methylene chloride. Recrystallization from acetone-hexane yields purified product, M.P. 158–160° C.

A solution of 1.5 g. of 6α-(β-hydroxy)ethyl-testosterone benzoate and 1.0 g. of p-toluene-sulfonyl chloride in 10 ml. of pyridine is maintained at room temperature for three hours. The reaction mixture is poured into water and extracted with methylene chloride. The methylene chloride extracts are washed with dilute phosphoric acid, combined, dried and evaporated to a residue of 6α-(β-tosyloxy)ethyltestosterone benzoate.

The crude tosylate is dissolved in 25 ml. of t-butanol and treated with 0.56 g. of potassium t-butoxide with stirring under nitrogen. After 30 minutes the reaction mixture is poured into water and extracted with ether. The ether extracts are dried and evaporated to a residue which is dissolved in benzene and filtered through 30 g. of activity III alumina. The filtrate is crystallized from acetone-hexane to give 6,6-ethylenetestosterone benzoate, M.P. 165–167° C.

A solution of 0.63 g. of 6,6-ethylenetestosteronebenzoate in 30 ml. of 95% ethanol containing 5 ml. of 10% aqueous sodium hydroxide is heated at reflux for one hour. The cooled solution is concentrated at reduced pressure, cooled and filtered to give 6,6-ethylenetestosterone, M.P. 221–223° C., a potent anabolic agent especially as its cyclopentenyl ether.

EXAMPLE 5

A mixture of 72.4 g. of crude 6-(β-acetoxy)ethyl-3-methoxy-17β-hydroxyandrosta-3,5-diene benzoate and 30 g. of sodium carbonate in 500 ml. of 5-butanol, 150 ml. of methanol and 150 ml. of water is heated at reflux with stirring for 24 hours. The cooled reaction mixture is concentrated, diluted with water and extracted with methylene chloride. The dried methylene chloride extract is dried and evaporated to a residue which is crystallized from ether-hexane to give 6-(β-hydroxy)ethyl-3-methoxy-17β - hydroxyandrosta-3,5-diene 17-benzoate, M.P. 148–151° C.

A solution of 20 g. of 6-(β-hydroxy)ethyl-3-methoxy-17β-hydroxyandrosta-3,5-diene 17-benzoate and 13 g. of p-toluene sulfonyl chloride in 60 ml. of pyridine is maintained at room temperature for 3 hours. After the addition of 5 ml. of water the reaction mixture is allowed to stand for 20 hours, poured into water and extracted with methylene chloride. The methylene chloride extracts are dried and evaporated to a residue of crude 6,6-ethylenetestosterone benzoate. This is hydrolyzed as described previously to yield 6,6-ethylenetestosterone, M.P. 218–221° C.

EXAMPLE 6

A suspension of 50.0 g. of testosterone acetate in 65 ml. of dioxane and 65 ml. of trimethyl orthoformate containing 0.5 g. of p-toluenesulfonic acid is stirred with warming to complete solution. A thick precipitate forms within a few minutes. The mixture is stirred for 30 minutes, cooled, treated with 5 ml. of pyridine and 130 ml. of water, and filtered. The filter cake is dried at 70° C. under vacuum to give 3-methoxy-17β-acetoxyandrosta-3,5-diene, M.P. 168–176° C. [reported: V. Petrow, et al., Tetrahedron, 20:597 (1964), M.P. 144–149° C.].

A mixture of 50.4 g. of 3-methoxy-17β-acetoxyandrosta-3,5-diene and 63.4 g. of β-acetoxyethyl mercuric acetate in 250 ml. of methylene chloride is treated with 4.7 ml. of boron trifluoride etherate at 0° C., under nitrogen, with stirring. The reaction mixture is stirred for three hours at 0° C. and is then maintained at 0° C. for three days. It is then treated with 30 ml. of pyridine, decanted from precipitated mercury, washed with aqueous sodium carbonate solution, dried and evaporated to a residue. The residue is dissolved in 50 ml. of benzene and 200 ml. of petroleum ether and filtered through 100 g. of activity I alumina. The alumina is washed with an additional 250 ml. of benzene-petroleum ether (1:4), and the combined filtrates are evaporated to a residue of 6-(β-acetoxy)ethyl-3-methoxy - 17β - acetoxyandrosta-3,5-diene.

Without further purification the diene is dissolved in 400 ml. of ethanol, treated with 50 ml. of 40% aqueous sodium hydroxide and stirred at reflux for one hour. The mixture is cooled, diluted with water and filtered. The filter cake is recrystallized from acetone-hexane to give 6,6-ethylenetestosterone, M.P. 221–223° C.

EXAMPLE 7

17α-methyltestosterone acetate is substituted for testosterone benzoate in Example 4 to give 3-ethovy-17α-methyl-17β-acetoxyandrosta-3,5-diene using triethylorthoformate, then to the 6-(β-hydroxyethyl)derivative, its tosyl-ester and finally the desired 6,6-ethylene-17α-methyl testosterone by cyclization.

3-methoxypregna-3,5,-diene is alkylated with acetoxyethyl mercuric acetate, converted to the 3-keto-4-alcohol, its tosyl ester and cyclized using sodium t-butoxide as in Example 1 to give 6,6-ethyleneprogesterone.

3-methoxy-17α-methylpregna-3,5-dien-20-one [Tetrahedron, 20:357 (1964)] is reacted with acetoxyethyl-mercuric acetate, converted to the alcohol, its β-bromo-ethyl derivative using tosyl bromide and cyclized as described to give 6,6-ethylene-17α-methyl progesterone.

3 - methoxy - 16α-methylpregna-3,5-dien-20-one (U.S. Pat. No. 3,114,750) is converted to its 6β-hydroxyethyl congener, the tosyl ester and cyclized to give 6,6-ethylene-16α-methylprogesterone.

3 - ethoxy - 17α,20:20,21-bismethylenedioxypregna-3,5-dien-11-one (U.S. Pat. No. 3,095,411) is reacted as in Example 2 to give the 6-β-hydroxyethyl congener, its tosyl ester and then cyclization gives 6,6-ethylene-17α, 20:20,21-bismethylenedioxy-pregn-4-en-3,11-dione which is converted into 6,6-ethylene-corrisone by standard reactions namely by hydroxlysis in 50% acetic acid.

EXAMPLE 8

A solution of 49 g. of 19-nortestosterone acetate in 65 ml. of dioxane and 50 ml. of trimethylorthoformate is treated with 0.25 g. of p-toluenesulfonic acid with stirring. After 8 hours the reaction mixture is quenched with pyridine, cooled and diluted with 115 ml. of water. The crystalline product is collected by filtration and recrystallized from alcohol-water containing a few drops of pyridine to yield 17β-acetoxy-3-methoxy-19-norandrosta-3,5-diene, M.P. 149–154° C.

To a stirred solution of 3.3 g. of the diene and 5.2 g. of β-acetoxyethyl mercuric acetate in 20 ml. of methylene chloride is added 0.3 ml. of borotrifluoride etherate. The addition is carried out dropwise under nitrogen at 0° C. The reaction mixture is maintained at 0° C. with stirring for 3 hours, quenched with 2 ml. of pyridine, diluted with methylene chloride, decanted from precipitated mercury, washed with dilute sodium carbonate solution, dried and evaporated to a residue. The residue is dissolved in 50 ml. of benzene-petroleum ether (1:2) and filtered through a column of 60 g. of activity III Woelm alumina. The column is washed with 200 ml. of the same solvent mixture and the total filtrate is evaporated to yield crude 17 - β - acetoxy-6-(β-acetoxyethyl)-3-methoxy-19-norandrosta-3,5-diene which is used directly in the next step.

A solution of 0.5 g. of the diacetate in 15 ml. of alcohol is refluxed with 1 ml. of 40% aqueous sodium hydroxide for 45 minutes. The cooled reaction mixture is diluted with water and extracted with methylene chloride. The methylene chloride extracts are dried and evaporated to a residue which is crystallized from ether, M.P. 173–178° C. Recrystallization from acetone-hexane gives pure 17β-hydroxy - 6-(β-hydroxyethyl(-3-methoxy-19-norandrostra-3,5-diene, M.P. 183–185° C.

A solution of 0.10 g. of the diol in 1 ml. of pyridine is treated with 0.09 g. of p-toluenesulfonyl chloride at 0° C. After 1.5 hours at 0° C. the reaction mixture is warmed to 27° C. for 0.5 hours, treated with 3 drops of water and allowed to stand for 16 hours. The reaction mixture is diluted with water and extracted with methylene chloride. After washing the methylene chloride extract with cold, dilute phosphoric acid it is dried and evaporated to a residue. The residue is dissolved in 10 ml. of benzene-petroleum ether (1:1) and chromatographed on 4 g. of activity III Woelm alumina. Elution with benzene and benzene-methylene chloride (3:1) gives 6,6-ethylene-19-nortestosterone which, after crystallization from ether-petroleum, ether, melts at 121–122° C.

Ester derivatives of the testosterones such as the acetate( benzoate are prepared as known to the art for the parent compounds.

EXAMPLE 9

51 g. of 3-(3-oxo-17β-hydroxyestr-4-en-17α-yl) propionic acid lactone [J. Org. Chem. 24, 743 (1949); 25, 96 (1965)] in a solution of 65 ml. of dioxane and 50 ml. of trimethylorthoformate is treated with 0.25 g. of p-toluenesulfonic acid with stirring. After 8 hours the reaction mixture is quenched with pyridine, cooled and diluted with 115 ml. of water. The product is collected by filtration and recrystallized from alcohol-water containing a few drops of pyridine to yield 3-(3-methoxy-17β-hydroxyestra-3,5-dien-17α-yl) propionic acid lactone.

To a stirred solution of 3.42 g. of the diene and 5.2 g. of β-acetoxyethyl mercuric acetate in 20 ml. of methylene chloride is added 0.3 ml. of borontrifluoride etherate. The addition is carried out dropwise under nitrogen at 0° C. The reaction mixture is maintained at 0° C. with stirring for 3 hours, quenched with 2 ml. of pyridine, diluted with methylene chloride, decanted from precipitated mercury, washed with dilute sodium carbonate solution, dried and evaporated to a residue. The residue is dissolved in 50 ml. of benzene-petroleum ether (1:2) and filtered through a column of 60 g. of activity III Woelm alumina. The column is washed with 200 ml. of the same solvent mixture and the total filtrate is evaporated to yield crude 3-(3 - methoxy - 6 - (β-acetoxy-ethyl-17β-hydroxy-estra-3,5-dien-17α-yl)propionic acid lactone, which is used directly in the next step.

A solution of 0.5 g. of the acetate in 15 ml. of alcohol is refluxed with 5 ml. of aqueous sodium carbonate for 45 minutes. The cooled reaction mixture is diluted with water and extracted with methylene chloride. The methylene chloride extracts are dried and evaporated to a residue which is crystallized to give 3-(3-methoxy-6-[β-hydroxy]-ethyl - 17β - hydroxyestra - 3,5-dien-17α-yl)propionic acid lactone.

A solution of 0.10 g. of the hydroxyethyl compound in 1 ml. of pyridine is treated with 0.09 g. of p-toluene-sulfonyl chloride at 0° C. After 1.5 hours at 0° C. the reaction mixture is warmed to 27° C. for 0.5 hour, treated with 3 drops of water and allowed to stand for 16 hours. The reaction mixture is diluted with water and extracted with methylene chloride. After washing the methylene chloride extract with cold, dilute phosphoric acid, it is dried and evaporated to a residue. The residue is dissolved in 10 ml. of benzene-petroleum ether (1:1) and chromatographed on 4 g. of activity III Woelm alumina. Elution with benzene and benzene-methylene chloride (3:1) gives 3-(3-oxo-6,6-ethylene-17β-hydroxyestra-4-ene-17α-yl)propionic acid lactone.

EXAMPLE 10

When 52.9 g. of 3-(3,11-dioxo-17β-hydroxyestr-4-en-17α-yl)propionic acid lactone is subjected to the series of reactions described in Example 9, including enol ether formation, acetoxyethylation, hydroysis, and ring-closure, 3 - (3,11 - dioxo - 6,6-ethylene-17β-hydroxyestr-4-en-17α-yl)propionic acid lactone is obtained.

What is claimed is:
1. The method of preparing 6,6-ethylene-3-keto-4[,5] steroids comprising
  (a) reacting a 3-methoxy-3,5-diene steroid with 3-acetoxyethylmercuric acetate in the presence of a Lewis acid to give a 6-β-acetoxyethyl-3-methoxy-3,5-diene steroid,
  (b) hydrolyzing said 3,5-diene steroid either with a mild alkaline solution or with a mild acid solution to give a 6-β-hydroxyethyl-3-methoxy-3,5-diene steroid or a 6-β-hydroxyethyl-3-keto-Δ4[,5] steroid respectively,
  (c) esterifying either said 6-β-hydroxyethyl steroid to form a 6-β-tosyloxyethyl or a 6-β-chloroethyl steroid, and
  (d) cyclizing said 6 - β - chloro or 6 - β - tosyloxyethyl steroid under mild conditions, said mild conditions being in the 3-methoxy-3,5-diene series in the presence of water and in the 3-keto-Δ4 series in the presence of an alkali metal lower alkoxide.
2. The method of claim 1 characterized in that the Lewis acid is boron trifluoride.

3. The method of preparing a compound possessing the partial structure:

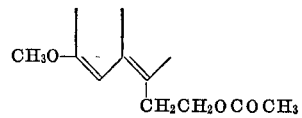

comprising reacting a compound possessing the partial structure:

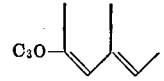

with β-acetoxyethylmercuric acetate in the presence of a Lewis acid.
4. The method of claim 3 characterized in that the Lewis acid is boron trifluoride.
5. The method of claim 3 characterized in that the Lewis acid is boron trifluoride etherate.
6. The method of preparing the compound of the structure:

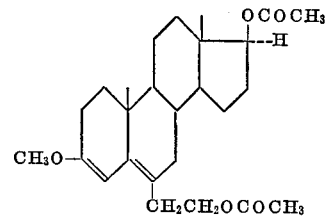

comprising reacting the compound of the structure:

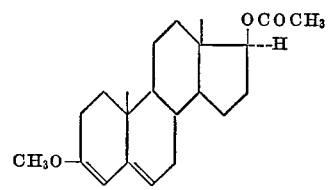

with β-acetoxyethylmercuric acetate in the presence of boron trifluoride.
7. The method of preparing a compound possessing the partial structure:

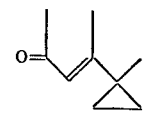

comprising reacting a compound possessing the partial structure:

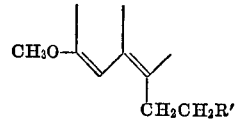

in which R' is a reactive halo, lower alkylsulfonyloxy, benzene-sulfonyloxy or p-toluenesulfonyloxy with an acid solution.
8. The method of claim 7 characterized in that R' is p-toluenesulfonyloxy.
9. The method of preparing a compound possessing the partial structure:

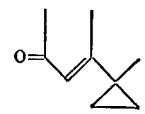

comprising reacting a compound possessing the partial structure:

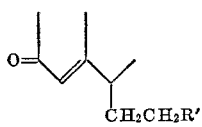

in which R' is a reactive halo, lower alkylsulfonyloxy, benzenesulfonyloxy or p-toluenesulfonyloxy with an alkali metal lower alkoxide.

10. The method of claim 9 characterized in that the alkali metal lower alkoxide is sodium or potassium tert.-butoxide.

11. The method of claim 10 characterized in that R' is p-toluenesulfonyloxy.

12. The method of preparing the compound of the structure:

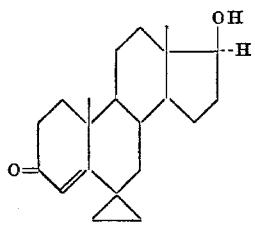

comprising reacting in the presence of water the compound of the structure:

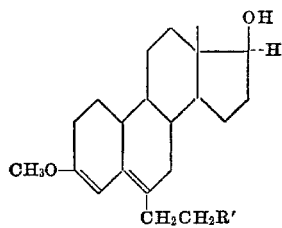

in which R' is a reactive halo, lower alkylsulfonyloxy, benzenesulfonyloxy or p-toluenesulfonyloxy.

13. The method of claim 12 characterized in that R' is p-toluenesulfonyloxy.

14. A compound of the structure:

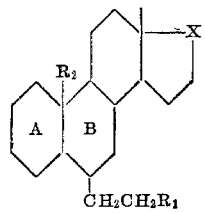

in which:

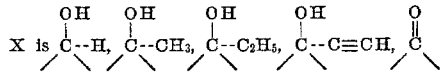

$R_1$ is chloro, hydroxy, acetoxy, or p-toluenesulfonyloxy,
$R_2$ is methyl or hydrogen
the A, B rings possess $\Delta^4$ a 3-methoxy-3,5-diene system.

15. 6 - ($\beta$ - hydroxy)ethyl - 3 - methoxy - 17$\beta$-hydroxy-androsta-3,5-diene.

16. 6 - ($\beta$ - hydroxy)ethyl - 3 - methoxy - 17$\beta$-hydroxy-19-nor-androsta-3,5-diene.

17. 3 - (3 - methoxy - 6-[$\beta$-hydroxy]ethyl-17$\beta$-hydroxy-estra-3,5-diene-17$\alpha$-yl)propionic acid lactone.

References Cited
UNITED STATES PATENTS

| | | | |
|---|---|---|---|
| 3,095,411 | 6/1963 | Kirk et al. | 260—239.55 |
| 3,166,551 | 1/1965 | Burn et al. | 260—239.55 |
| 3,261,829 | 7/1966 | Colton et al. | 260—239.5 |

HENRY A. FRENCH, Primary Examiner

U.S. Cl. X.R.

260—397.3, 397.4, 397.47, 397.5, 999